Jan. 7, 1958     G. C. EKOLA     2,818,992
RELEASABLE COVER AND SEAL FOR CONTAINERS
Filed Aug. 15, 1955
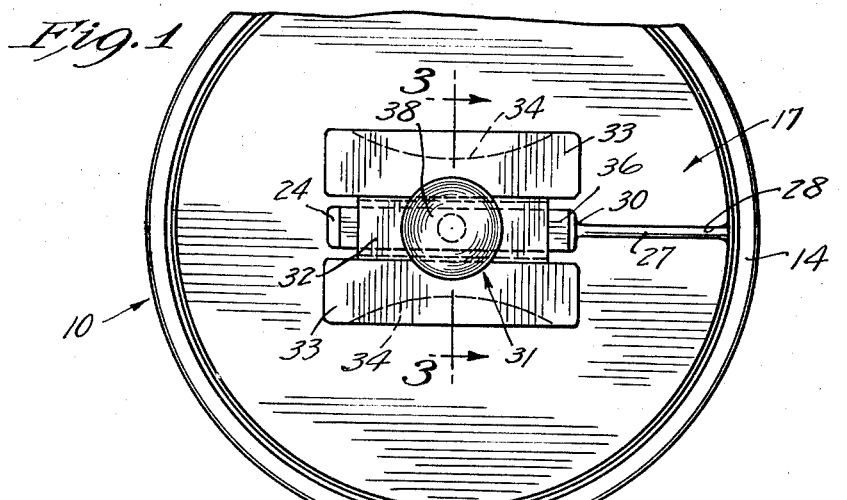
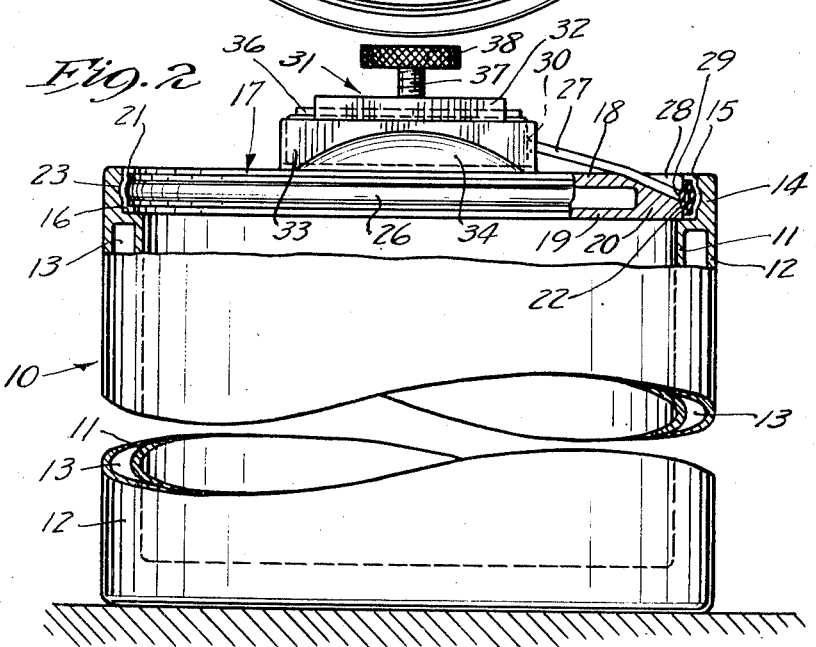
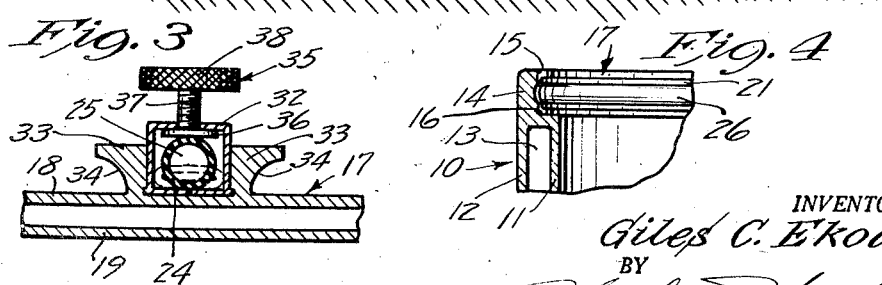
INVENTOR.
Giles C. Ekola
BY
Merchant & Merchant
ATTORNEYS

2,818,992
RELEASABLE COVER AND SEAL FOR CONTAINERS

Giles C. Ekola, New York Mills, Minn.

Application August 15, 1955, Serial No. 528,501

1 Claim. (Cl. 220—24.5)

My invention relates to a container having a releasable cover and seal therefor.

An object of my invention is to provide a novel and improved sealing arrangement for a container having a releasable cover.

Another object of my invention is to provide a device of the class described which is simply operative and of simple construction and yet which provides a more effective seal for containers having releasable covers than any previously known in the art.

Another object of my invention is to provide a device of the class described which is particularly adapted for containers constructed in the manner of vacuum bottles or jugs and which permits the use of a wide mouth cover for such containers.

A further object of my invention is to provide a wide mouthed container constructed in the manner of vacuum bottles or jugs and having a wide mouth releasable cover therefor, and wherein I provide a novel and improved sealing arrangment which provides for greatly increased heat or cold retention than any container of vacuum bottle construction now known in the art.

A still further object of my invention is to provide a device of the class described in the aforementioned object which is of simple construction and is simply and effectively operative.

These and other objects and advantages of my invention will become apparent from the following detailed specification and claim, reference being had to the accompanying drawings where:

Fig. 1 is a view in top plan of my invention with some parts broken away;

Fig. 2 is a view in side elevation of the structure shown in Fig. 1, with some parts being broken away and some shown in section;

Fig. 3 is a fragmentary view in vertical section taken substantially on the line 3—3 of Fig. 1; and Fig. 4 is a fragmentary view of a portion of Fig. 2 showing the sealing tube of my invention in expanded sealed relationship.

Referring more particularly to the drawings, wherein like parts will be indicated by the same numeral, I provide an open topped container indicated in its entirety by the numeral 10. Preferably, container 10 is of vacuum bottle construction and comprises inter-connected inner and outer walls 11 and 12 respectively, with an evacuated space 13 therebetween. Preferably, in the manner of vacuum bottle construction, walls 11 and 12 are formed of glass and are silver coated to limit heat exchange from within to without container 10. I provide container 10 with a wide mouth which distinguishes it from vacuum bottle construction now generally known. Preferably, container 10 has an annular lip portion, indicated by the numeral 14, which defines a generally cylindrical inner surface 15 adjacent the open top of container 10. Surface 15 is radially outwardly spaced with respect to inner wall portion 11 to provide a shoulder 16.

I provide a wide mouth cover for container 10 which is indicated in its entirety by the general reference numeral 17. Preferably, cover 17 is of vacuum bottle construction and comprises a pair of generally parallel spaced coated wall portions 18 and 19, and an annular wall portion 20 which interconnects wall portions 18 and 19. Cover 17 encloses an evacuated space between the wall portions 18 and 19. Annular wall portion 20 defines a circumferentially extending peripheral surface 21 which mates with the opening bounded by circumferentially extending surface 15. Although both peripheral surface 21 of cover 17 and inner surface 15 adjacent the open top of container 10 are preferably shown to be cylindrical, it is conceivable that they might take other forms, for example, either square or rectangular with rounded corners, without parting from the scope of my invention.

Cover 17 releasably fits into the open top or mouth of container 10 to be disposed in a closure position, shown in Fig. 2, wherein peripheral surface 21 of cover 17 is inwardly disposed in closely adjacent relationship with the inner surface 15 defined by lip portion 14. Shoulder 16 provides means limiting downward movement of cover 17 into the container 10, wherein cover 17 rests thereon. It should be clear, however, that the means limiting downward movement of the cover 17 is not restricted to shoulder 16, particularly shown herein; and this might be accomplished in several other ways which it is not believed necessary to enumerate. However, for example, cover 17 might have a radially outwardly projecting annular flange which engages the top of container 10, or the inner circumferentially extending surface of container 10 and the circumferentially extending peripheral surface of cover 17 might be interfitting tapering surfaces.

Cover 17 has a radially outwardly opening circumferentially-extending recess 22 formed in annular wall portion 20 thereof; and container 10 has an inwardly opening circumferentially extended recess 23 formed in lip portion 14 thereof. Recess 23 will face recess 22 when cover 17 is in its closure position.

I provide a closed fluid system comprising a longitudinally extended yieldable resilient tube member 24, which preferably may be formed of rubber, which defines an expansible and contractible sealing tube 26; and a connecting conduit 27 between chamber 25 and sealing tube 26. Sealing tube 26 extends circumferentially about peripheral surface 21 within the recess 22, and preferably is stretched onto cover 17 to be carried thereby. Sealing tube 26 is preferably of flat construction, as shown in Fig. 2, so that it will normally be maintained in a flat contracted position and so that it will permit a minimum of clearance between peripheral surface 21 of cover 17 and inner surface 15 of lip portion 14.

As shown clearly in Fig. 2, cover 17 has an indentation, indicated by the numeral 28, formed therein adjacent the circumferentially extending peripheral surface 21. Indentation 28 opens outwardly at peripheral surface 21 and upwardly towards the topside of cover 17 and is generally longitudinally aligned with tube member 24 so that conduit 27 may extend from one end of tube member 24 and join sealing tube 26 at a place intermediate its lateral limits, or mid-point of inner wall 29; wherein the connection of conduit 27 to sealing tube 26 will not interfere with the minimum of clearance between peripheral surface 21 and inner surface 15. Conduit 27 preferably joins tube member 24 at a place generally centrally of one end thereof, indicated by the numeral 30 in Fig. 2, so that the compression of tube member 24 or contraction of chamber 25 will not block conduit 27 in any manner. Conduit 27 may be formed of rubber tubing. The fluid system comprising tube member 24, sealing tube 26, and connecting conduit 27 uses a low heat conducting fluid, or the like, which is injected into or down out of sealing tube 26 upon contraction or expansion of chamber 25, respectively.

It is clear that the structure defining expandable and contractible chamber 25, although preferably comprising the longitudinally extending rubber tube member 24, could be any suitable structure such as a piston cylinder arrangement. Further, the sealing tube 26 could be of round construction, rather than the flat construction preferably shown; however, a round sealing tube would have a tendency to remain round which would not provide the easy removal of the cover 17 effected by the preferred flat construction which I have shown.

I provide any suitable means for expanding and contracting chamber 25, and the form of this means is somewhat dependent upon the structure used to define expandible and contractible chamber 25. With tube member 24 I provide clamp means indicated in its entirety by the general reference numeral 31, connected to the topside of cover 17 for adjustment between two positions; wherein at one position clamp means 31 squeezes or compresses tube member 24 to contract chamber 25 and at the other position clamp means 31 is released to permit chamber 25 to expand. Preferably clamp means 31 includes a longitudinally extending sleevelike housing 32 which loosely encompasses tube member 24 and is connected to the topside of cover 17 by being channeled between a pair of laterally spaced longitudinally extended upstanding handle members 33. Handle members 33 each have an arcuate recess 34 formed therein to provide finger grips to facilitate releasing the cover 17 or removing it from the container 10. A screw type clamp member 35 has a longitudinally extending horizontally disposed plate 36 rigidly secured thereto, which is disposed within housing 32 and overlies tube member 24. A threaded shank portion 37 of clamp member 35 extends through a threaded aperture formed in the housing 32 in screw-threaded engagement. Clamp member 35 has a knurled head 38 to facilitate screwing the plate 36 toward and away from tube member 24.

The operation of my invention is relatively simple, yet extremely effective. When clamp member 35 is in the position shown in Fig. 3, tube member 24 and chamber 25 are expanded. When chamber 25 is expanded, sealing tube 26 is in its normal contracted position shown in Fig. 2 and the fluid of the system is substantially all within the chamber 25. Screwing clamp member 35 downwardly towards the cover 17 moves plate 36 downwardly to squeeze or compress tube member 24 to the position shown in dotted lines in Fig. 3 which contracts chamber 25. This forces the fluid from chamber 25 through conduit 27 into sealing tube 26 to expand sealing tube 26 into sealing relationship between peripheral surface 21 of cover 17 and inner surface 15 of lip portion 14, see Fig. 4. When sealing tube 26 is expanded, it is forced into recess 23 which forms a very tight and effective seal. Clamp member 35 will maintain tube member 24 in its compressed position and sealing tube 26 in expanded sealing relationship until clamp member 35 is released. This is accomplished by merely screwing the clamp member 35 to move plate 36 away from tube member 24 which allows the latter to expand. The expansion of chamber 25 permits the fluid of the system to return thereto. Upon releasing clamp 35, the construction of flat sealing tube 26 returns it to its normal contracted position which forces the fluid back into chamber 25 and permits cover 17 to be easily removed from container 10.

My invention makes it unnecessary to thread or clamp the cover 17 shut and provides a seal which is extremely effective. My invention is adapted for widespread application, and, for example, may be used for laboratories to store and transport serums, or for transporting and handling ice cream, or with large containers for the retention of deep frozen or high temperature foods, and of course for vacuum bottle containers in the various sizes presently used.

It will be obvious to those skilled in the art that my invention may be modified by many substitutions and equivalents and that this disclosure is intended to be illustrative; therefore, I intend to be limited solely by the scope of the appended claim.

What I claim is:

A container having a releasable cover and seal therefor comprising an open-topped container member; a cover having a top surface and rigid therewith a depending circumferential surface about the periphery of said top surface which adjoins the inner surface of said container member adjacent the open top thereof in inwardly disposed adjacent relationship at a closure position of said cover; means limiting movement of said cover from its closure position into said container member; a pair of laterally spaced longitudinally extended handle members rigid with the top surface of said cover and projecting outwardly thereof at the closure position thereof, said handle members defining a longitudinally extended space therebetween; a closed fluid system comprising a longitudinally extended yieldable resilient tube member confined in said space and defining an expansible and contractible fluid chamber, a circumferentially extending expansible and contractible sealing tube of generally flat construction and which normally maintains a flat contracted position being carried by said cover about said depending circumferential surface and adapted to be disposed between said depending surface and the inner surface of said container member at the closure position of said cover, and a connecting conduit between said tube member and said sealing tube; said cover having an indentation formed in the top surface thereof which is generally aligned with said tube member and extends to said depending surface of said cover to provide access to the adjacent wall of said sealing tube; said connecting conduit being disposed in said indentation; and means carried by said cover and engageable with said tube member for expanding and contracting the fluid chamber defined thereby; whereby said sealing tube is in expanded sealing relationship between the inner surface of said container member and the depending circumferential surface of said cover when said fluid chamber is contracted and said sealing tube is in contracted releasable relationship with the inner surface of said container member when said fluid chamber is expanded.

References Cited in the file of this patent

UNITED STATES PATENTS 658,588     Reynolds et al. _____ Sept. 25, 1900

FOREIGN PATENTS 547,072     Great Britain _____ Aug. 12, 1942